United States Patent
Grudnoski et al.

(10) Patent No.: US 7,730,715 B2
(45) Date of Patent: Jun. 8, 2010

(54) FAN FRAME

(75) Inventors: Jennifer Grudnoski, Mulliken, MI (US); John DiTomasso, Glastonbury, CT (US); Akwetee E. Watkins, Wallingford, CT (US); Jody M. Grosso, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 969 days.

(21) Appl. No.: 11/434,493

(22) Filed: May 15, 2006

(65) Prior Publication Data

US 2007/0264128 A1 Nov. 15, 2007

(51) Int. Cl.
*F02K 3/02* (2006.01)
(52) U.S. Cl. ............... 60/226.1; 60/796; 415/209.3
(58) Field of Classification Search ......... 60/226.1, 60/796; 415/209.3, 213.1
See application file for complete search history.

(56) References Cited

U.S. PATENT DOCUMENTS

| | | | |
|---|---|---|---|
| 4,722,184 A * | 2/1988 | Chaplin et al. ........... 60/226.1 |
| 4,834,613 A | 5/1989 | Hansen et al. ............ 415/160 |
| 5,222,360 A * | 6/1993 | Antuna et al. ............ 60/226.1 |
| 5,307,623 A * | 5/1994 | Antuna et al. ............ 60/226.1 |
| 5,320,490 A * | 6/1994 | Corbin et al. ............ 415/209.3 |
| 5,471,743 A | 12/1995 | Munroe et al. ........... 29/889.3 |
| 6,672,833 B2 | 1/2004 | MacLean et al. ........ 415/196 |
| 2004/0060280 A1* | 4/2004 | Malmborg ................ 60/226.1 |
| 2005/0106009 A1* | 5/2005 | Cummings et al. ........ 415/145 |

* cited by examiner

*Primary Examiner*—Michael Cuff
*Assistant Examiner*—Phutthiwat Wongwian

(57) ABSTRACT

A fan frame (10) for a gas turbine is provided. The fan frame (10) has fan exit guide vanes (100) that are connected to an intermediate case (50) for structural support, and are constrained from movement in a radial direction by a first joint (110, 110a) and constrained from movement in an axial and radial direction by a second joint (120a, 110a). The intermediate case (50) provides structural integrity while reducing weight by providing struts (56, 95) with a width that increases in a direction away from a central bearing (55) as the thickness of the struts (56, 95) decreases.

7 Claims, 7 Drawing Sheets ved from the central bearing. The intermediate case can have a circular wall connected to a leading edge of each of the core struts and to a rear flange of each of the plurality of fan exit guide vanes. The circular wall can be tapered. The assembly may further comprise a cylindrical tube between a rear wall of the intermediate case and the center wall. The intermediate case can have an arch positioned between each of the plurality of core struts.

FAN FRAME

BACKGROUND OF THE INVENTION

1. Field of the Invention

This invention relates to gas turbines. More specifically, the invention relates to a fan frame for a gas turbine.

2. Description of the Related Art

Gas turbine engines include an engine core and a fan section. In aircraft, the engine core is disposed on the airframe and has a primary flowpath. The fan section is disposed coaxial with and radially outward of the engine core, and has a secondary flowpath. A fan cowling envelops the fan section and outwardly bounds the secondary flowpath. An area of concern with gas turbine engines is the structural mounting of the fan section with the engine core. The mounting structure is required to transfer all the operational loads, such as structural, thrust and aerodynamic loads, to the fan frame and thence to the airframe.

With reference to FIG. 1, a mounting structure for a turbofan including an engine core and a fan assembly is described in U.S. Pat. No. 5,471,743. The fan assembly has a fan disk and a plurality of fan blades, which extend outwardly across the flowpath. A fan cowling extends circumferentially about the blades and a plurality of fan exit case guide vanes. The fan exit case guide vanes are attached to the fan cowling and to a support cone, which are disposed between the engine core and the plurality of guide vanes. An intermediate case structurally connects the fan cowling to the engine core. The intermediate case includes a plurality of struts and an outer ring or fan exit case rear. The struts extend from the inner platform of the engine core to the outer ring. Each of the struts is hollow to reduce weight and circumferentially continuous about a spanwise axis of the strut. The outer ring connects the intermediate case with the fan cowling through a bolted connection. Each of the struts has a joint radially located near the inner flow surface of the fan assembly.

In the above-described mounting configuration, separate guide vanes and struts are utilized. However, shorter distances between the back of fan blades and the fan exit guide vanes generally increase noise produced by the fan assembly. Thus, there is a need for a fan frame or assembly that reduces noise while maintaining structural integrity.

BRIEF SUMMARY OF THE INVENTION

A fan assembly for a gas turbine is provided. The assembly has one or more fan blades and a fan frame. The fan frame has a fan exit case rear, a plurality of fan exit guide vanes and an intermediate case. Each of the plurality of fan exit guide vanes is connected to the intermediate case by a forward joint and an aft joint. For each of the plurality of fan exit guide vanes, one of either the forward joint or the aft joint constrains movement of the fan exit guide vane in a radial direction with respect to the intermediate case, while the other of the forward joint or the aft joint constrains movement of the fan exit guide vane in an axial direction with respect to the intermediate case.

In another aspect, a fan assembly for a gas turbine is provided. The assembly has one or more fan blades and a fan frame. The fan frame has a fan exit case rear, a plurality of fan exit guide vanes and an intermediate case. The intermediate case has a central bearing and a plurality of core struts extending from the central bearing. Each of the core struts has a width and a thickness, wherein the width increases in a direction away from the central bearing as the thickness decreases in the direction away from the central bearing.

In yet another aspect, a method of supporting a fan assembly of a gas turbine engine is provided. The method has the steps of, but is not limited to, connecting a plurality of fan exit guide vanes between a fan exit case rear and an intermediate case. One of a forward portion and an aft portion of each of the plurality of fan exit guide vanes is constrained from movement in a radial direction with respect to the intermediate case. Another of the forward portion and the aft portion of each of the plurality of fan exit guide vanes is constrained from movement in an axial direction with respect to the intermediate case.

The forward joint or the aft joint can have mating surfaces with a V-groove, dovetail, conical snap, fir-tree and other engagement structures. The forward or aft joint can further comprise a blind boss. The forward joint or aft joint may have mating surfaces with a dovetail.

The intermediate case can have a circular wall connected to a leading edge of each of the core struts and to a rear flange of each of the plurality of fan exit guide vanes. The circular wall can be tapered. The assembly may further comprise a cylindrical tube between a rear wall of the intermediate case and the center wall. The intermediate case can have an arch positioned between each of the plurality of core struts.

BRIEF DESCRIPTION OF THE DRAWINGS

Other uses and advantages of the present invention will become apparent to those skilled in the art upon reference to the specification and the drawings, in which.

DETAILED DESCRIPTION OF THE INVENTION

Figure 1:
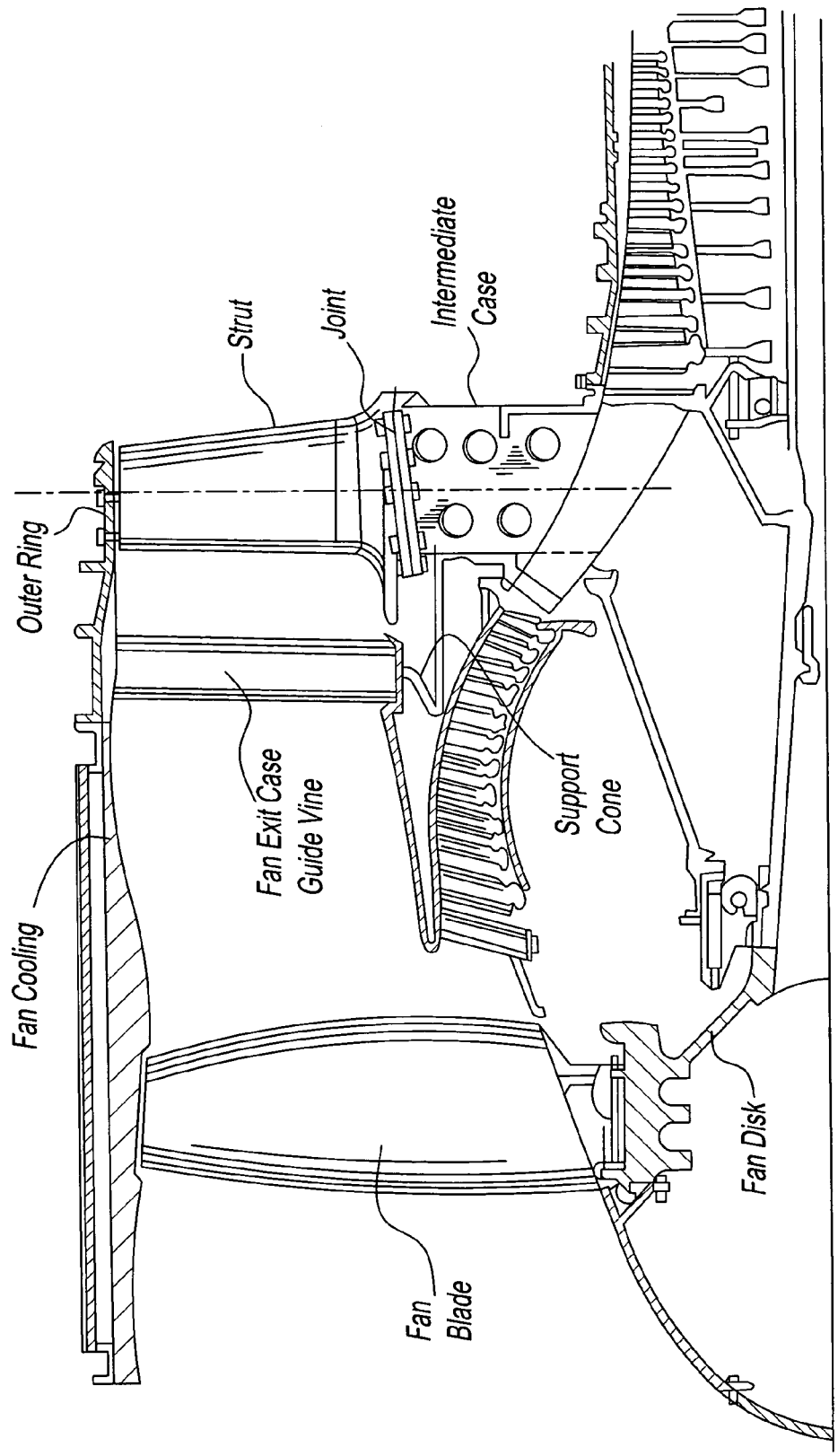
FIG. 1 is a schematic view of a mounting structure for a turbofan including an engine core and a fan assembly as described in U.S. Pat. No. 5,471,743.
Figure 2:
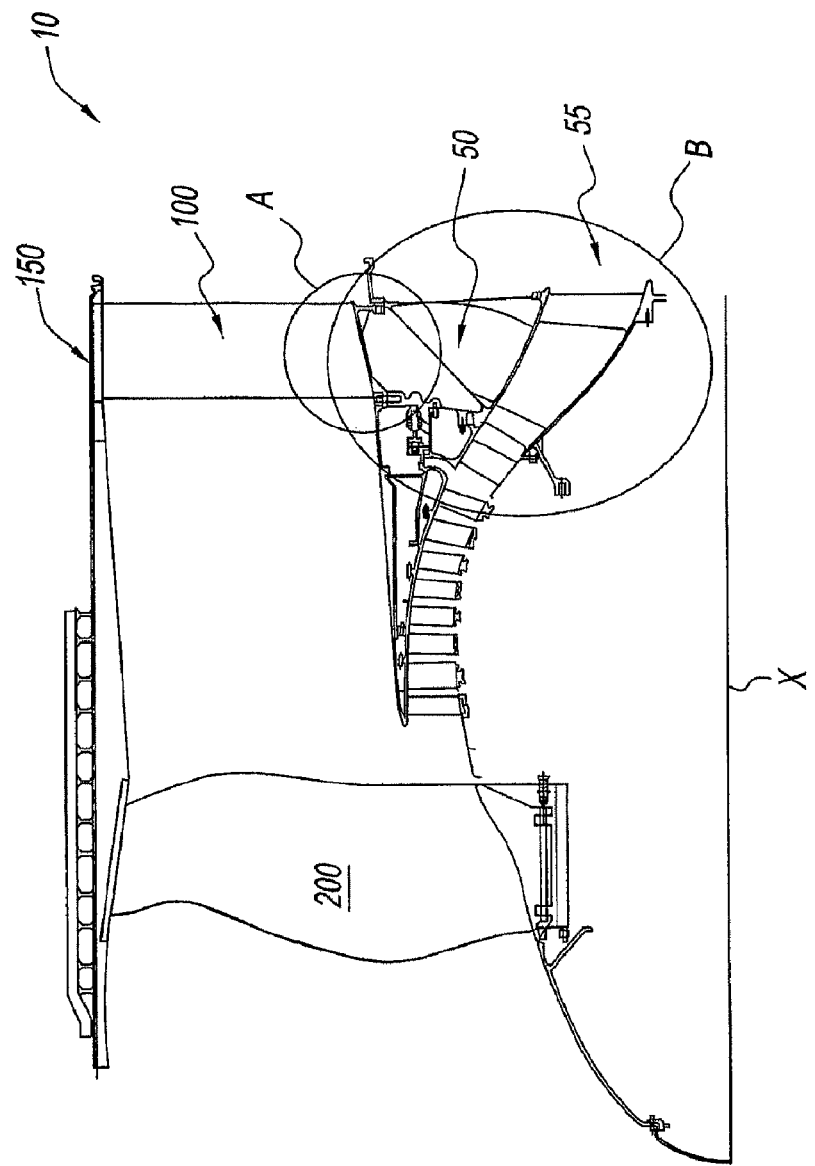
FIG. 2 is a schematic view of an exemplary embodiment of a portion of a gas turbine having a fan frame of the present invention.

FIG. 2 provides a schematic view of an exemplary embodiment of a portion of a gas turbine having a fan frame of the present invention generally represented by reference numeral 10. The fan frame 10 is usable with various types of gas turbines having components known in the art including, but not limited to, fan assemblies, compressors, turbines and combustors.

The fan frame 10 has an intermediate case 50, a plurality of guide vanes or fan exit guide vanes 100 (only one of which is shown) and an outer ring or fan exit case rear 150. The fan frame 10 is disposed downstream of a plurality of fan blades 200 (only one of which is shown) and together comprise a fan assembly of the gas turbine engine. In order to decrease the noise produced by the fan assembly, the distance between the fan blades 200 and the fan exit guide vanes 100 is increased. The fan exit guide vanes 100 are incorporated with the struts of the prior art. As such, the fan exit guide vanes 100 are the connecting structure between the intermediate case 50 and the fan exit case rear 150, and must be capable of bearing the corresponding load transmitted to the fan assembly.

Figure 3:
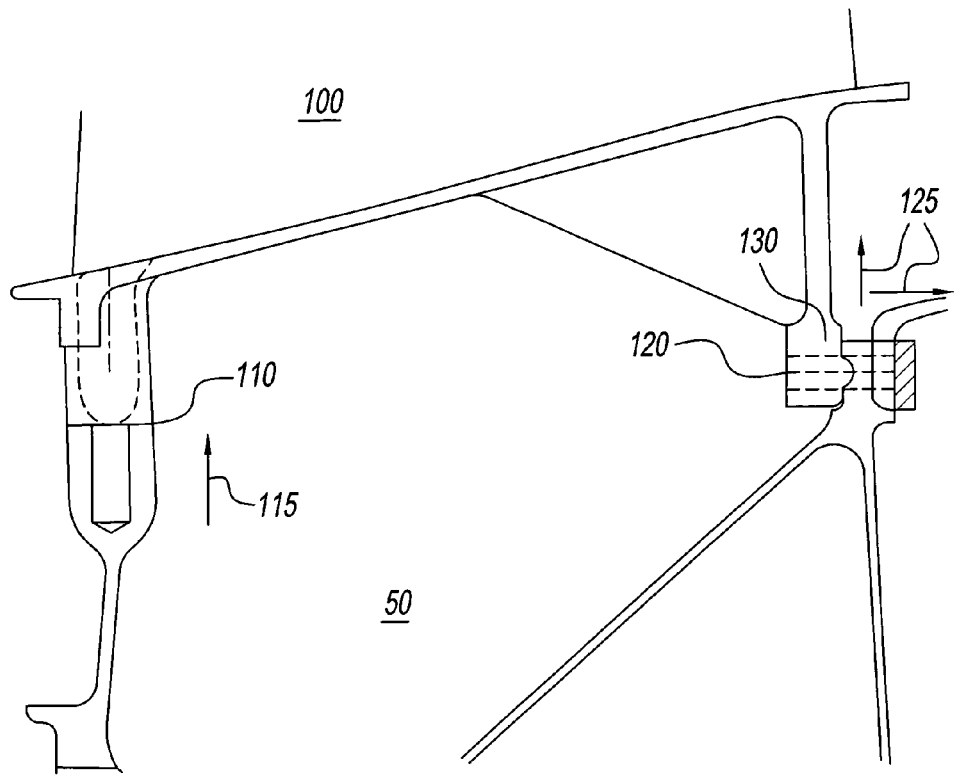
FIG. 3 is a schematic view of portion A of the fan frame of FIG. 2.

Referring to FIGS. 2 and 3, to accommodate this load, each of the fan exit guide vanes 100 is connected to the intermediate case 50 by a forward joint 110 and an aft joint 120. The forward and aft joints 110 and 120 constrain movement of the fan exit guide vanes 100 with respect to the intermediate case 50, and transmit the load along one of a radial or an axial direction. As can be seen in FIG. 3, the forward joint 110 is connected in a direction perpendicular to the centerline X of the gas turbine to constrain movement along the radial direction, as shown by arrow 115. The aft joint 120 is connected in a direction parallel to the centerline X of the gas turbine to constrain movement along the radial and axial direction with the V-groove, as shown by arrow 125.

Each of the fan exit guide vanes 100 is constrained from movement in both the axial and radial directions with respect to the intermediate case 50. While the exemplary embodiment of fan frame 10 has the forward joint 110 constraining movement along the radial direction and the aft joint 120 constraining movement along the radial and axial direction, the present disclosure contemplates the opposite configuration where the forward joint 110 constrains movement along the radial and axial direction and the aft joint 120 constrains movement along the radial direction.

The type of joint or connection used for either or both of forward and aft joints 110 and 120 can be varied to facilitate connection, as well as improve the structural integrity, such as, for example, use of a full ring or broken hoop connection on the intermediate case 50. The forward and aft joints 110 and 120 and vanes can be individual or in packs or clusters. The forward and aft joints 110 and 120 can have surfaces that facilitate connection, as well as provide structural integrity, such as, for example, dovetailed mating surfaces and/or blind bosses.

Figure 3A:
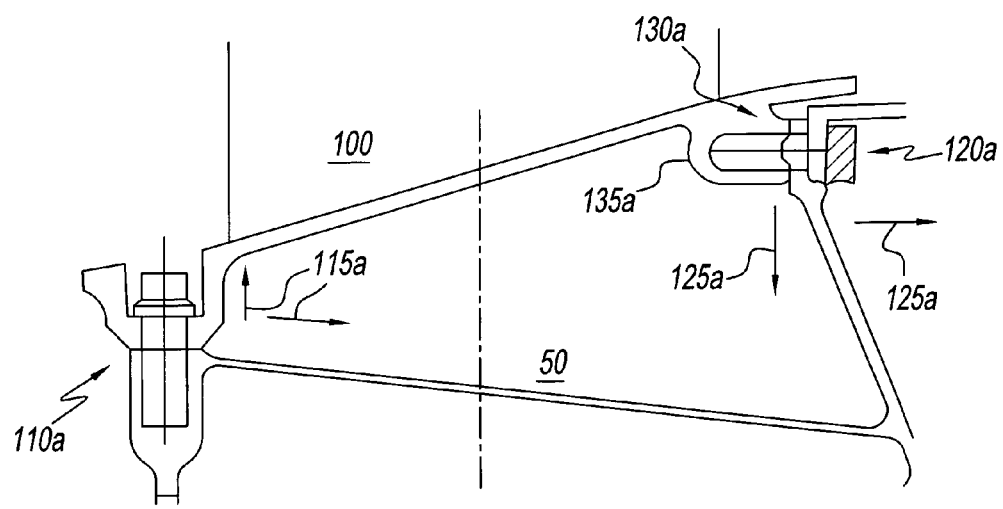
FIG. 3a is a schematic view of an alternative connection of portion A between the Fan Exit Guide Vane and Intermediate Case of FIG. 2.

In an alternate connection shown in FIG. 3*a*, the forward joint 110*a* is connected in a direction perpendicular to the centerline X of the gas turbine to constrain movement along the radial and the axial directions as shown by arrow 115*a*. The aft joint 120*a* is connected in a direction parallel to the centerline X of the gas turbine to constrain movement along the radial and the axial directions as shown by arrow 125*a*. Aft joint 120*a* has dovetailed mating surfaces 130*a* and a blind boss 135*a*.

Figure 4:
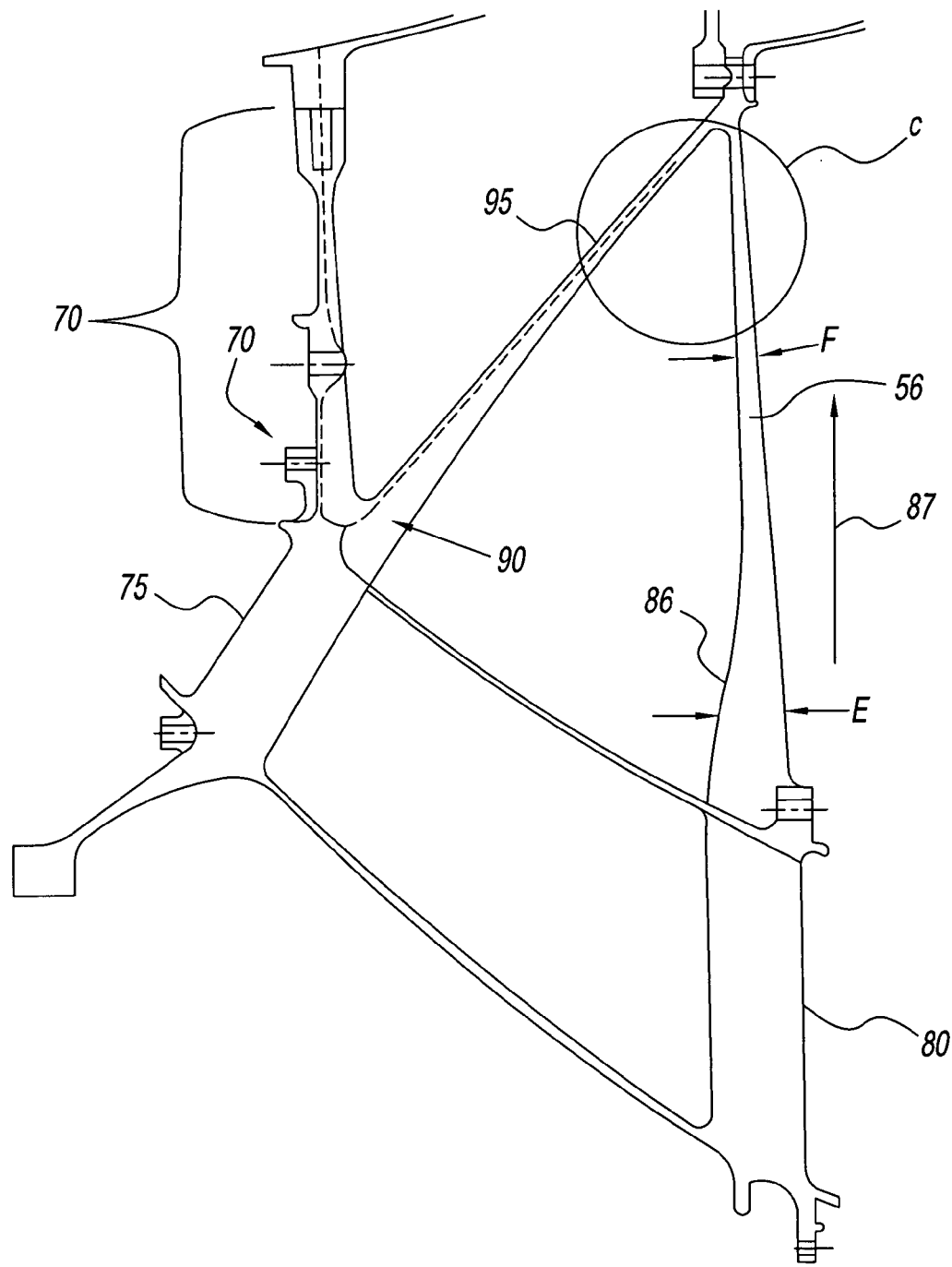
FIG. 4 is a schematic view of portion B of the fan frame of FIG. 2.
Figure 5:
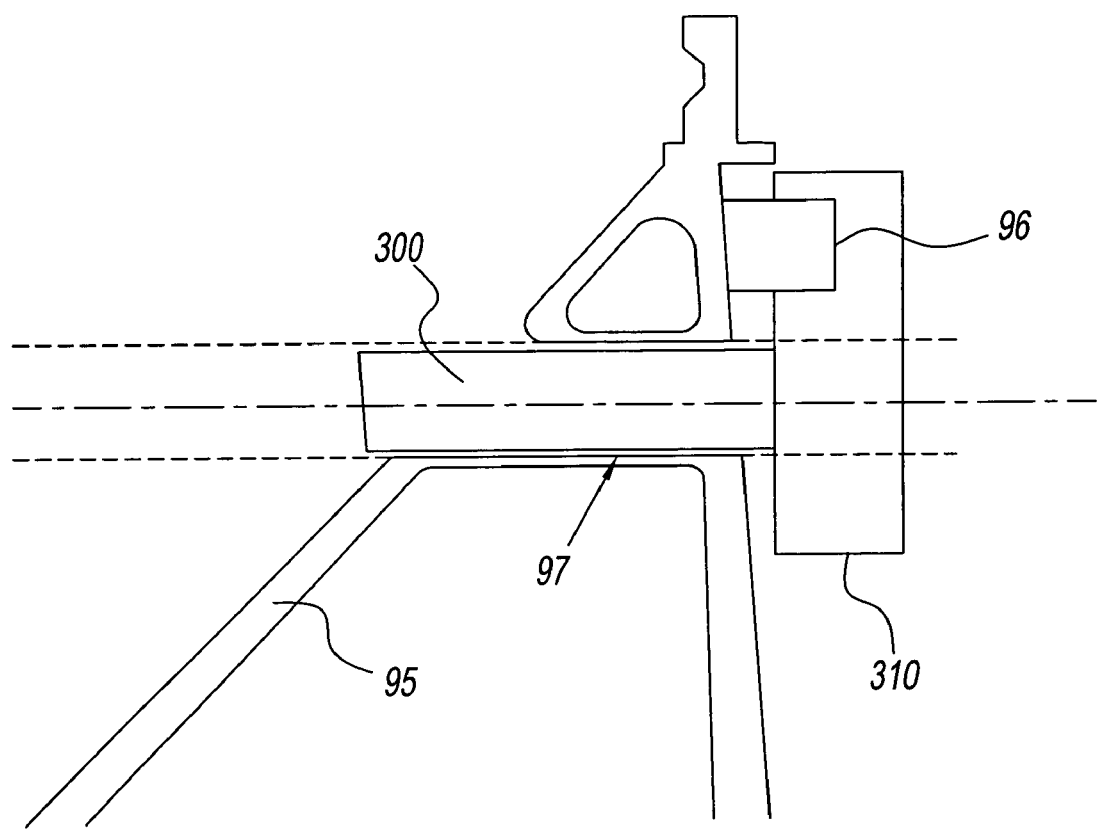
FIG. 5 is a schematic view of portion C of the fan frame of FIG. 4.
Figure 6:
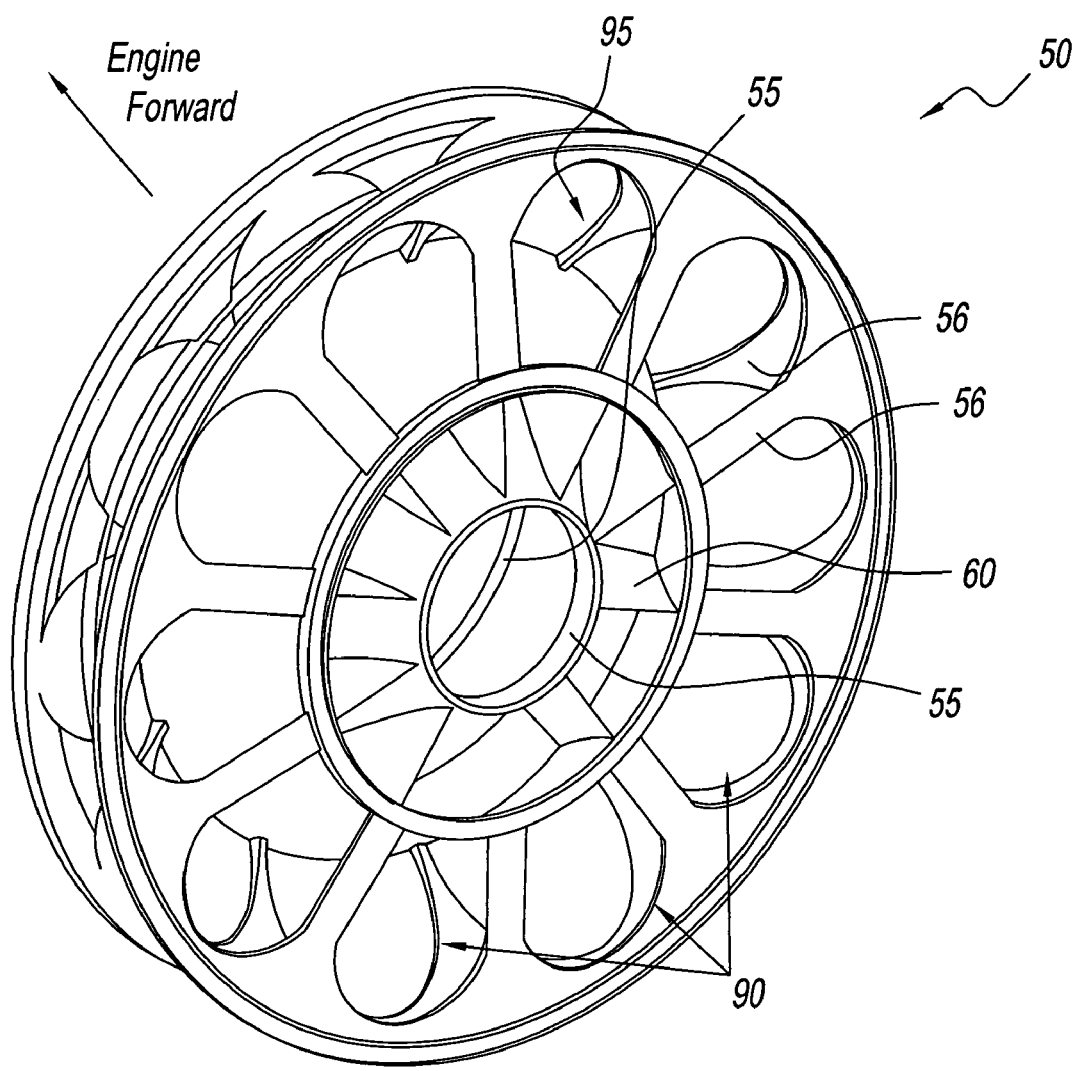
FIG. 6 is a rear perspective view of the intermediate case of FIG. 2.

Referring to FIGS. 4 through 6, the intermediate case 50 is preferably made from a one-piece investment casting. In order to transmit the load from the central bearing supports 55 and the core struts 60 through the transition region members or struts 56 and 95, while minimizing the amount of material needed, the cross-sectional area of the material is held within 10% as the cross-sectional area of the leading edge 75 of the core struts, and preferably the cross-sectional area of the material is held substantially the same as at the leading edge 75 of the core struts. The material axial thickness is decreased in a direction away from the gas turbine centerline X while the material circumferential length is increased. This decrease in axial thickness of the material is shown in FIG. 4 from points E to F in the direction represented by arrow 87. The resulting geometry maintains the structural integrity of the intermediate case 50 and the stiffness of the bearing supports 55 under pitch moment loading, while reducing the amount of material and thus the weight of the intermediate case.

The torque box portion 70 of the intermediate case 50 is the region between the core struts 60 and the fan exit guide vanes 100. The axial thickness of the torque box portion 70 of the intermediate case 50 and the strut 56 outboard of the leading edge 75 and the trailing edge 80 of the core strut 60 is reduced with increasing distance from the gas turbine centerline X (this reduction in material is shown generally by reference numerals 76 and 86, respectively in FIG. 4), while the circumferential width of the material is increased to maintain the same cross-sectional area as at the leading edge. In order to transmit the load from the central bearing supports 55 and the core struts 60 through the transition region members or struts 56 and 95, while minimizing the amount of material needed, the cross-sectional area of the material is held within 10% as the cross-sectional area of the trailing edge 80 of the core struts, and preferably the cross-sectional area of the material is held substantially the same as at the trailing edge 80 of the core struts. The resulting geometry maintains the structural integrity of the intermediate case 50 and the case stiffness under pitch moment loading, while reducing the amount of material and thus the weight of the case. The geometry of the intermediate case 50 of a reduction of axial thickness and an increase in circumferential width in a direction away from the center of the intermediate case, as described above, results in arches 90 being formed in transition members.

The torque box portion 70 also has a conical center wall 95 that is diagonal, which connects the rear flange of the fan exit guide vanes 100 to the outer diameter of the leading edge of the core strut 60 (as shown in portion B in FIG. 4). The circular center wall 95 may be tapered, of non-uniform thickness or have other shapes. The center wall 95 increases the stiffness of the intermediate case 50, provides a firewall, a secondary load path, and a flow guide for the interstage bleed air. The center wall 95 is preferably integrally formed with the arches 90. Although, alternative connection structures and methods are contemplated, e.g., welding. Preferably, the thickness of the material that is radially inboard of the arches 90 is minimized, e.g., in proximity to manufacturing minimum limits. The purpose of the material inboard of the arches 90 is to separate compartments. As such, it is preferably made as thin as practically possible.

Referring to FIG. 5, the interstage bleed valve control rod 300 passes through the center wall 95. This is due to the valve actuator 310 being mounted to the rear wall of the intermediate case 50, while the valve (not shown) is located in front of the intermediate case. Preferably, a thin-walled cylindrical tube 97 is cast or formed between the actuator boss 96 on the rear wall of the intermediate case 50 and the center wall 95. Tube 97 prevents breach of the center wall 95 by the control rod. Alternatively, the actuator can be mounted directly to the center wall 95.

Figure 7:
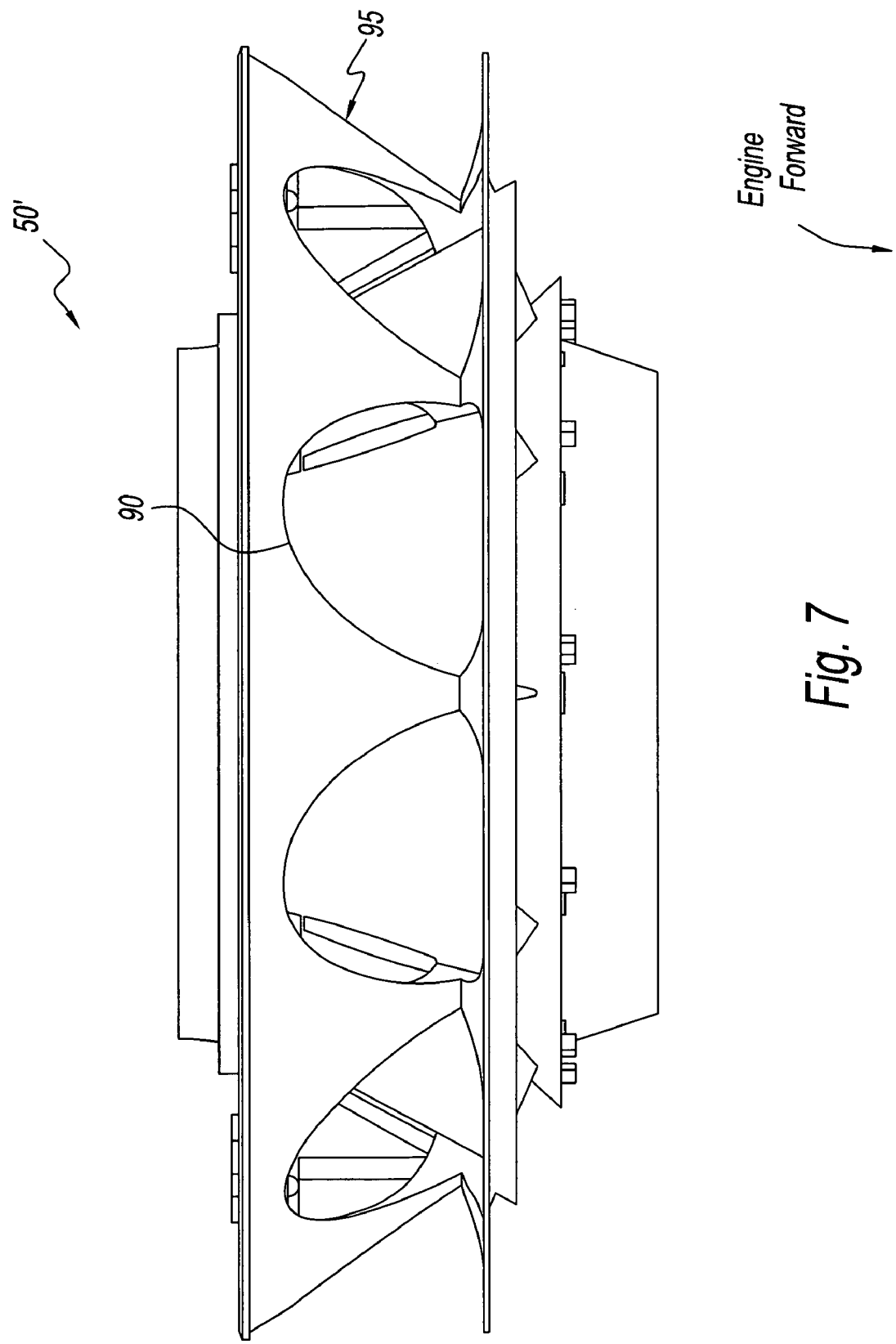
FIG. 7 is a side view of another intermediate case of the present invention.

Referring to FIG. 7, another intermediate case 50' is shown having similar features represented by the same reference numerals. In order to transmit the load from the central bearing supports and the core struts through the transition region members or struts 56, while minimizing the amount of material needed, the cross-sectional area of the material is again held within 10% as the cross-sectional area of the leading edge of the struts, and preferably the cross-sectional area of the material is held substantially the same as at the leading edge of the struts. The resulting geometry maintains the structural integrity of the intermediate case 50' and the stiffness of the bearing supports 55 under pitch moment loading, while reducing the amount of material and thus the weight of the intermediate case. The geometry of the intermediate case 50' of a reduction of axial thickness and an increase in circumferential width in a direction away from the center of the intermediate case, as described above, results in arches 90 being formed in transition members.

While the instant disclosure has been described with reference to one or more exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this invention, but that the invention will include all embodiments falling within the scope of the appended claims.

What is claimed is:

1. A fan assembly for a gas turbine, the assembly comprising:
   one or more fan blades; and
   a fan frame having a fan exit case rear, a plurality of fan exit guide vanes and an intermediate case having a plurality of struts, wherein each of said plurality of fan exit guide vanes is connected to said intermediate case by a forward joint and an aft joint, wherein, for each of said plurality of fan exit guide vanes, one of said forward joint and said aft joint constrains movement of said fan exit guide vane in a radial and an axial direction with respect to said intermediate case and the other of said forward joint and said aft joint constrains movement of said fan exit guide vane in said radial direction with respect to said intermediate case, and wherein each of said struts has a circumferential width that increases and an axial thickness that decreases as each strut extends towards one of said forward joint and said aft joint.

2. The assembly of claim 1, wherein said forward joint or said aft joint has mating surfaces with a dovetail.

3. The assembly of claim 2, wherein said mating surfaces with said dovetail are disposed with said forward joint or said aft joint that constrains movement of said fan exit guide vane in said radial and said axial directions.

4. The assembly of claim 1, wherein said aft joint further comprises a blind boss.

5. The assembly of claim 4, wherein said aft joint has mating surfaces with a dovetail.

6. The assembly of claim 5, wherein said aft joint constrains movement of said fan exit guide vane in said radial and said axial directions.

7. The assembly of claim 1, wherein said plurality of struts extend from a central bearing.

* * * * *